United States Patent
Lin et al.

(10) Patent No.: US 8,802,264 B2
(45) Date of Patent: Aug. 12, 2014

(54) EASY-TO-ASSEMBLE BATTERY PACK WITH PRISMATIC BATTERY CELLS

(75) Inventors: Yhu-Tin Lin, Rochester Hills, MI (US); Andrew H. Leutheuser, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 438 days.

(21) Appl. No.: 12/774,873

(22) Filed: May 6, 2010

(65) Prior Publication Data
US 2011/0274956 A1 Nov. 10, 2011

(51) Int. Cl.
*H01M 2/10* (2006.01)
*H01M 10/50* (2006.01)
*H01M 2/20* (2006.01)

(52) U.S. Cl.
CPC ........ *H01M 2/1077* (2013.01); *H01M 10/5032* (2013.01); *Y02E 60/12* (2013.01); *H01M 10/5048* (2013.01); *H01M 10/5016* (2013.01); *H01M 2/206* (2013.01)
USPC ............... 429/99; 429/96; 429/149; 429/151; 429/152; 429/158; 429/159; 429/160

(58) Field of Classification Search
CPC .......... H01M 10/5016; H01M 10/5032; H01M 10/5048; H01M 2/1077; H01M 2/206; Y02E 60/12
USPC ............. 429/400–535, 96, 99, 149, 151, 152, 429/158, 159, 160
See application file for complete search history.

(56) References Cited

U.S. PATENT DOCUMENTS

| | | | | |
|---|---|---|---|---|
| 6,060,198 | A * | 5/2000 | Snaper ........................ | 429/233 |
| 6,410,184 | B1 | 6/2002 | Horiuchi et al. | |
| 6,821,671 | B2 * | 11/2004 | Hinton et al. ................ | 429/120 |
| 7,504,179 | B2 * | 3/2009 | Tanjou et al. ................ | 429/162 |
| 2003/0017380 | A1 * | 1/2003 | Cooper et al. ................ | 429/46 |
| 2003/0211384 | A1 * | 11/2003 | Hamada et al. .............. | 429/120 |
| 2004/0038122 | A1 | 2/2004 | Hisamitsu et al. | |

(Continued)

FOREIGN PATENT DOCUMENTS

| | | |
|---|---|---|
| JP | 11-176400 A | 7/1999 |
| JP | 2009105058 A | 5/2009 |
| KR | 2010 081674 A | 7/2010 |

OTHER PUBLICATIONS

U.S. Office Action dated Jun. 8, 2012 pertaining to U.S. Appl. No. 12/853,462, filed Aug. 10, 2010.

(Continued)

*Primary Examiner* — Milton I Cano
*Assistant Examiner* — Lung R Zeng
(74) *Attorney, Agent, or Firm* — Dinsmore & Shohl LLP

(57) ABSTRACT

A weld-free, frameless battery design is provided. The design reduces the number of parts and the weight of the battery pack, simplifies the assembly operation, and keeps the battery pack reparable and remanufacturable with minimal effort and cost. The battery pack includes a stack of battery cells and cooling fins, and a removable restraint is placed around the stack. The positive and negative tabs of the battery cells comprise a pair of sub-tabs which are bent over the faces of the cell. One type of cell can have an extended portion on one of the positive and one the negative sub-tabs which are on opposite faces of the cell. The sub-tabs are used to make the necessary series and parallel connections.

20 Claims, 14 Drawing Sheets

(56) References Cited

U.S. PATENT DOCUMENTS

| | | | |
|---|---|---|---|
| 2005/0089750 A1* | 4/2005 | Ng et al. | 429/120 |
| 2005/0089751 A1 | 4/2005 | Oogami et al. | |
| 2007/0141457 A1* | 6/2007 | Amagai | 429/152 |
| 2008/0193830 A1* | 8/2008 | Buck et al. | 429/120 |
| 2009/0029251 A1* | 1/2009 | Baba | 429/209 |
| 2009/0142628 A1 | 6/2009 | Okada et al. | |
| 2009/0325051 A1 | 12/2009 | Niedzwiecki et al. | |
| 2010/0055993 A1 | 3/2010 | Ikeda et al. | |
| 2010/0143782 A1* | 6/2010 | Kruger et al. | 429/120 |
| 2010/0266883 A1 | 10/2010 | Koetting et al. | |
| 2010/0273091 A1* | 10/2010 | Brey et al. | 429/513 |
| 2011/0052969 A1* | 3/2011 | Cai et al. | 429/158 |
| 2011/0162820 A1 | 7/2011 | Weber et al. | |
| 2011/0293982 A1 | 12/2011 | Martz et al. | |

OTHER PUBLICATIONS

Office Action mailed Oct. 29, 2012 pertaining to U.S. Appl. No. 12/853,521.

Office Action mailed Jan. 17, 2013 pertaining to U.S. Appl. No. 12/853,462.

U.S. Non-Final Office Action dated Mar. 1, 2013 pertaining to U.S. Appl. No. 12/853,521, filed Aug. 10, 2010.

U.S. Non-Final Office Action dated Feb. 6, 2013 pertaining to U.S. Appl. No. 12/853,620, filed Aug. 10, 2010.

Final Office Action dated May 31, 2013 pertaining to U.S. Appl. No. 12/853,620, filed Aug. 10, 2010.

* cited by examiner

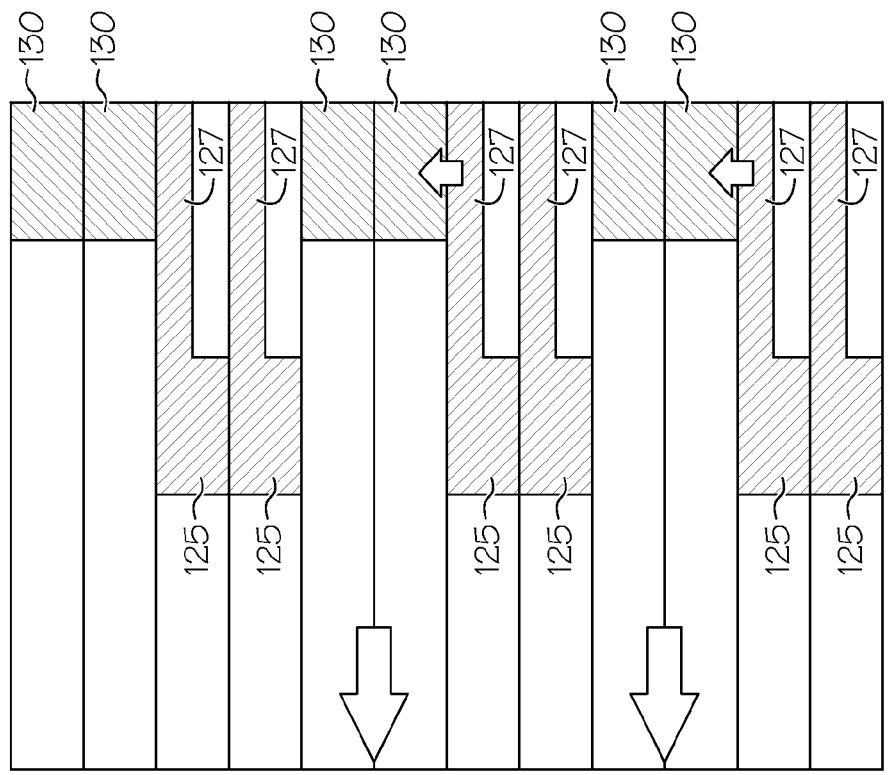
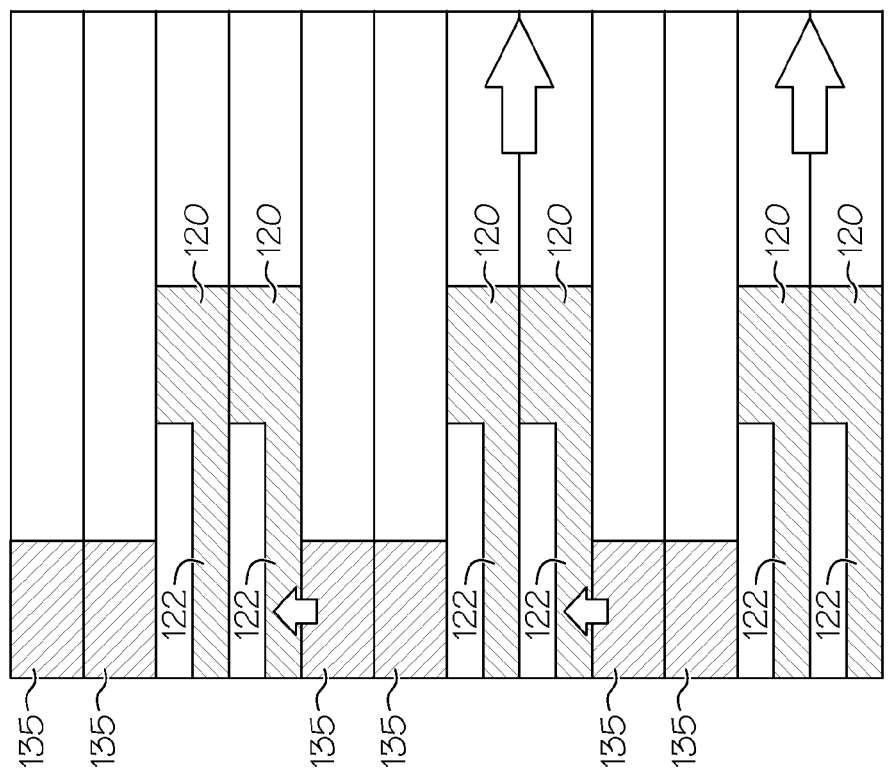
FIG. 10A
FIG. 10B

EASY-TO-ASSEMBLE BATTERY PACK WITH PRISMATIC BATTERY CELLS

BACKGROUND

The invention relates generally to battery packs, and more particularly to battery packs which are easy to assemble and disassemble.

The battery assembly for hybrid or plug-in electric vehicles (EV) may consist of a plurality of battery cells 10, cooling fins 15, repeating frames 20, and foam sheets 25, which are stacked and joined together to form a module or pack as shown in FIG. 1. Although the battery cells are the only energy and power source of the battery, the assembly needs the other components to form a fully functional and reliable system. All of them add weight and complexity to the battery pack. For example, the total weight of the repeating frames can be as much as 10% of the total weight of the battery pack.

The battery for a long driving range EV may contain more than 200 battery cells. The cells are preferably in prismatic shape for better spatial energy density and thermal efficiency. The individual number of cooling fins, repeating frames, and foam sheets can be half as many as the number of battery cells. Each part possesses different material properties and a different geometric shape. The battery cells are semi-rigid and laminated in a pouch. The cooling fins, which can be made of a single piece of aluminum or two aluminum sheets welded together with coolant passages inside for example, are prismatic and thin, but stiffer than the battery cells. The foam sheets, which provide space for thermal expansion and compression, are relatively soft and have rubber gasket borders. The plastic repeating frames, which are narrow and hollow, have intricate interlocking details and coolant seals on both sides of the frame. The large number of different parts makes a fast stacking operation challenging enough. The differences in physical form and properties further increase the difficulty and complexity of automated assembly, requiring costly assembly equipment or causing a slower assembly operation.

Typically, after stacking and assembling the battery components into a module, every two or three adjacent battery cells are welded together to form parallel electric connections. Each cell has at least two tabs or electric terminals (one positive, one negative) for such welding. An interconnect board can be added and welded to the cells to complete the serial connection of the battery pack, if desired. The welding operations require proper welding machines and tooling, and they are expensive and time consuming operations. Furthermore, due to the difficulty of precise tab bending and height control, the protrusion of any tabs after welding poses the risk of an electric short with the battery monitor board attached on top of the battery pack.

Finally, due to the irreversible nature of current welding techniques, such as spot welding and ultrasonic welding, removing a bad cell from a fully assembled battery pack requires cutting all the tab connections in the module. Thus, the good battery cells are unable to be re-welded, which is an expensive product and manufacturing problem.

Therefore, there is a need for an improved battery pack that can be easily assembled and disassembled.

SUMMARY OF THE INVENTION

A weld-free, frameless battery design is provided. The design significantly reduces the number of parts and the weight of a battery pack, simplifies the assembly operation, and keeps the battery pack repairable and remanufacturable with minimal effort and cost. In addition, the battery design maintains flexibility in serial/parallel connection of battery cells, the allowance for thermal expansion, and the freedom of liquid or air cooling/heating.

In one embodiment, the battery pack includes at least two battery cells in electrical contact, the battery cells having first and second faces, the battery cells having a positive tab and a negative tab on an edge of the battery cell, the positive tab comprising a pair of sub-tabs bent over the first and second faces of the cell, and the negative tab comprising a pair of sub-tabs bent over the first and second faces of the cell; a positive terminal in electrical contact with one of the positive sub-tab of one of the battery cells; a negative terminal in electrical contact with one of the negative sub-tabs of another one of the battery cells; at least one cooling fin positioned between battery cells; and a removable restraint around the first and second battery cells and the fin.

BRIEF DESCRIPTION OF THE DRAWINGS

FIGS. 10A-B are schematic electric flows of an alternate embodiment.

DETAILED DESCRIPTION

Figure 1:
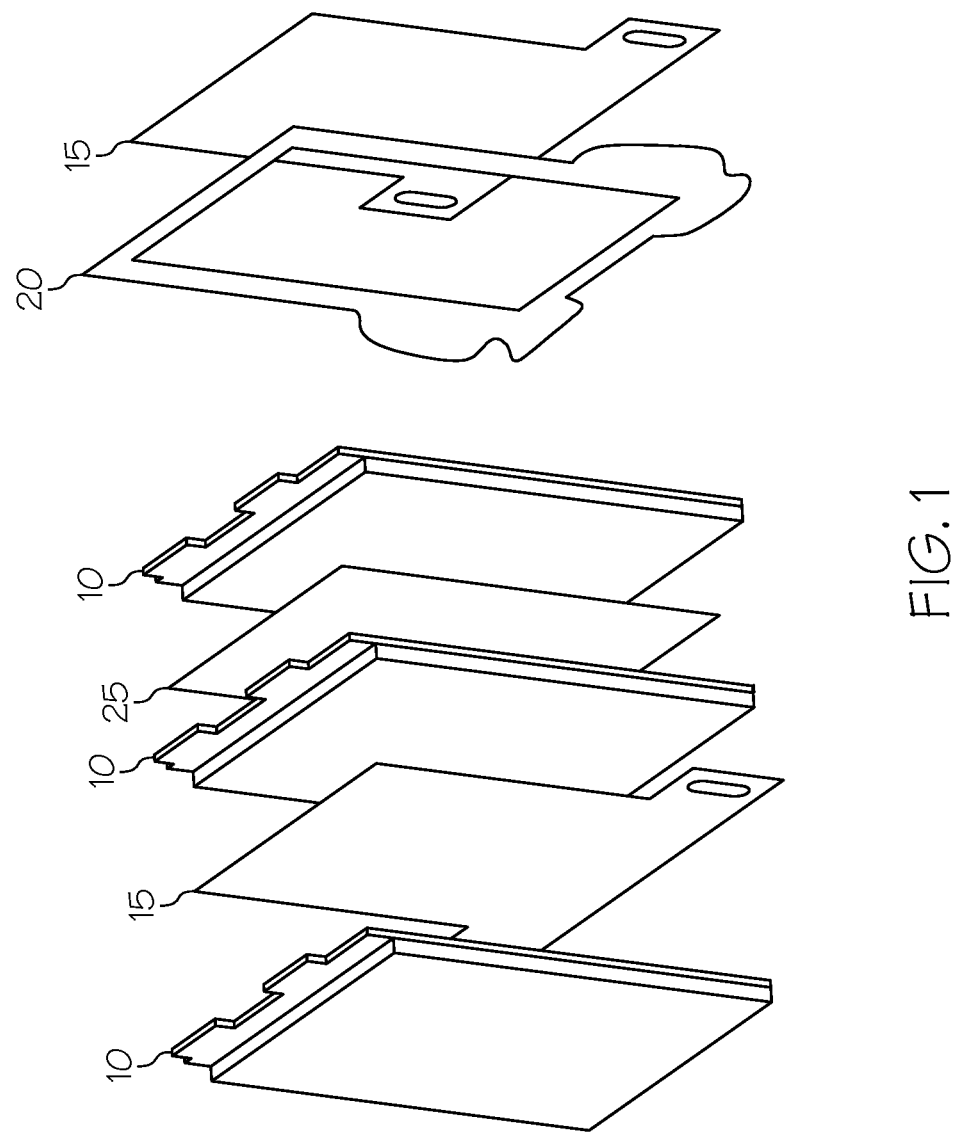
FIG. 1 is an illustration of the parts in a prior art battery pack.

As shown in FIGS. 2-5, the battery pack 100 includes two types of battery cells 105, 110 and cooling/heating fins 115. The battery cells 105, 110 are generally the same as the commercially available products. They can be contained in a pouch or a hard case, if desired. No internal chemicals or materials need to be changed. Each battery cell 105 has a positive tab 120 and a negative tab 125, and each battery cell 110 has a positive tab 130 and a negative tab 135. Each positive or negative tab has two separable sub-tabs 140, 145 that can be bent toward the two faces of the battery cell package respectively. The sub-tabs form two electric terminals of the same polarity, positive or negative.

Figure 4:
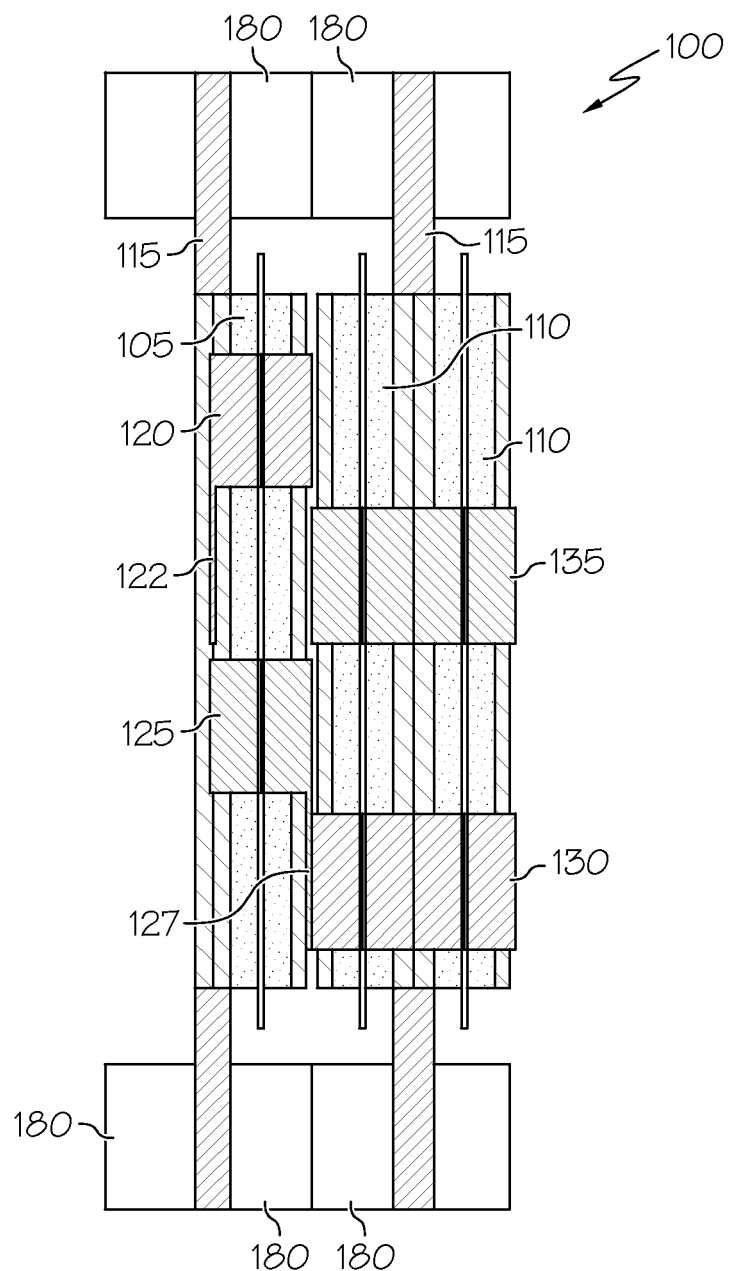
FIG. 4 is a top view of the battery pack of FIG. 2.
Figure 5D:
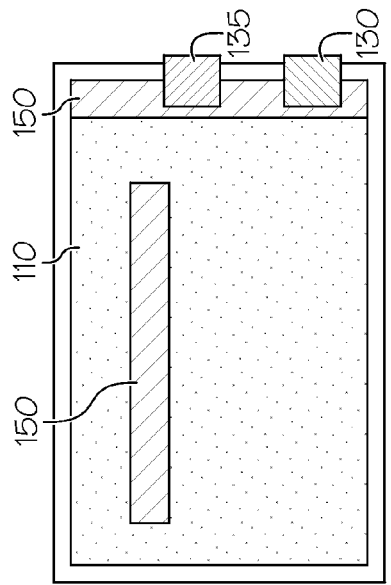
FIGS. 5A-E are an illustration of two types of battery cells and one embodiment of a fin.
Figure 5E:
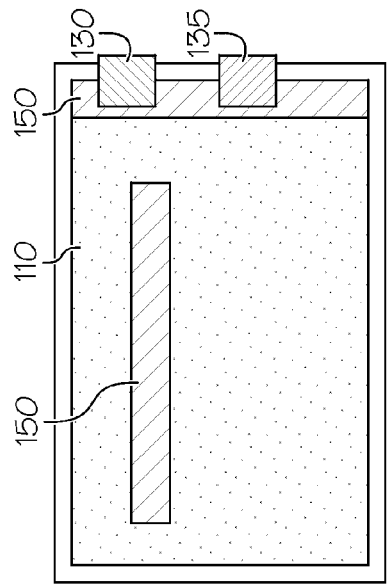
Figure 5C:
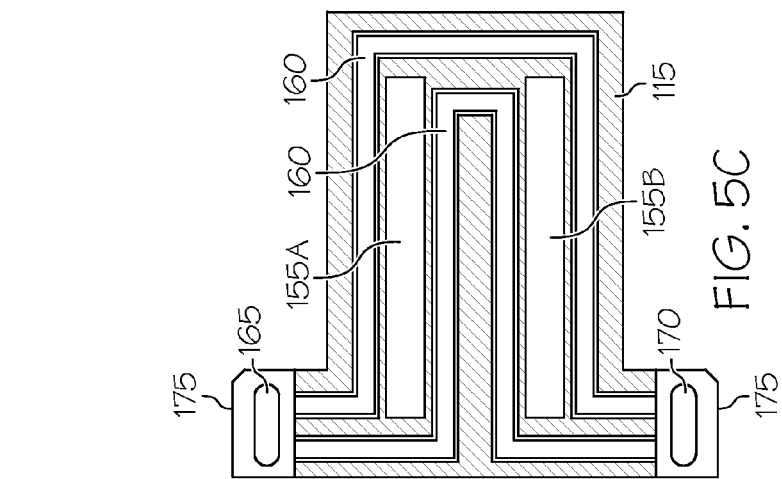
Figure 5A:
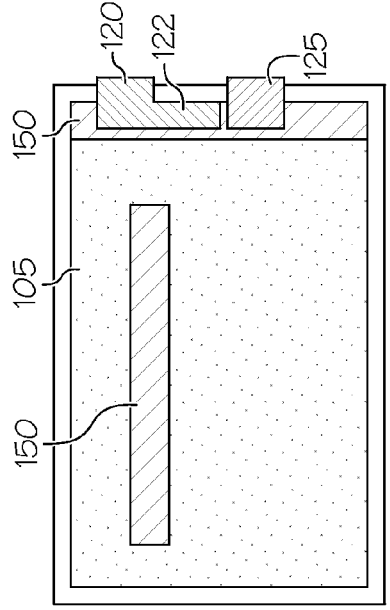
Figure 5B:
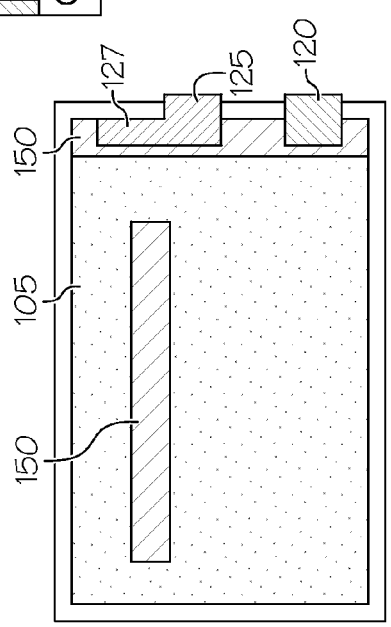

FIGS. 5A-B are the front and rear faces of battery cell 105, while FIGS. 5D-E show the front and back of battery cell 11. The two types of battery cells 105 and 110 are essentially identical. The only significant difference is that for cell type 105, the positive tab 120 has an extended portion 122 on one face and the negative tab 125 has an extended portion 127 on the other face of the cell. As shown in FIG. 4, a parallel cell connection can be arranged by stacking the same type of cells, type 105 or type 110, next to each other. Any switch from type 105 cells to type 110 cells or vice versa in the stack changes the battery connection to be in series. Therefore, the combination of parallel and serial connections in a battery pack is unlimited. The battery cells are connected by the direct mechanical contact in the stack. No welding or interconnect frame is needed.

Instead of stacking the battery pack with separate pieces of foam between the cells as in typical prior art designs, the battery cell can have at least one, pre-attached foam strips 150 on each face of the cell. In addition to assisting with assembly compliance, the strips 150 closest to the positive and negative tabs 120, 125 also serve as the mounting pads for fixing the bent sub-tabs 140, 145 on the strips 150 at specified locations.

As shown in FIG. 5, the thin, but stiff cooling/heating fins 115 have two slots 155A and 155B to fit the foam strips 150 of adjacent cells. For instance, the fin 115 may stack on top of the front face of the cell 110 with one of its foam strips fitting into the slot 155A, then the next cell, either 105 or 110 will have one of its foam strips on the back face fitting into the slot 155B of the same fin. As such, the slots 155A and 155B help align the relative position between the battery cells 105, 110 and the fins 115. The fins 115 can have a thickness such that when the cell stack is compressed, the foam strips can be squeezed to let the cells be in solid contact with the fins for best heat transfer efficiency.

Figure 2:
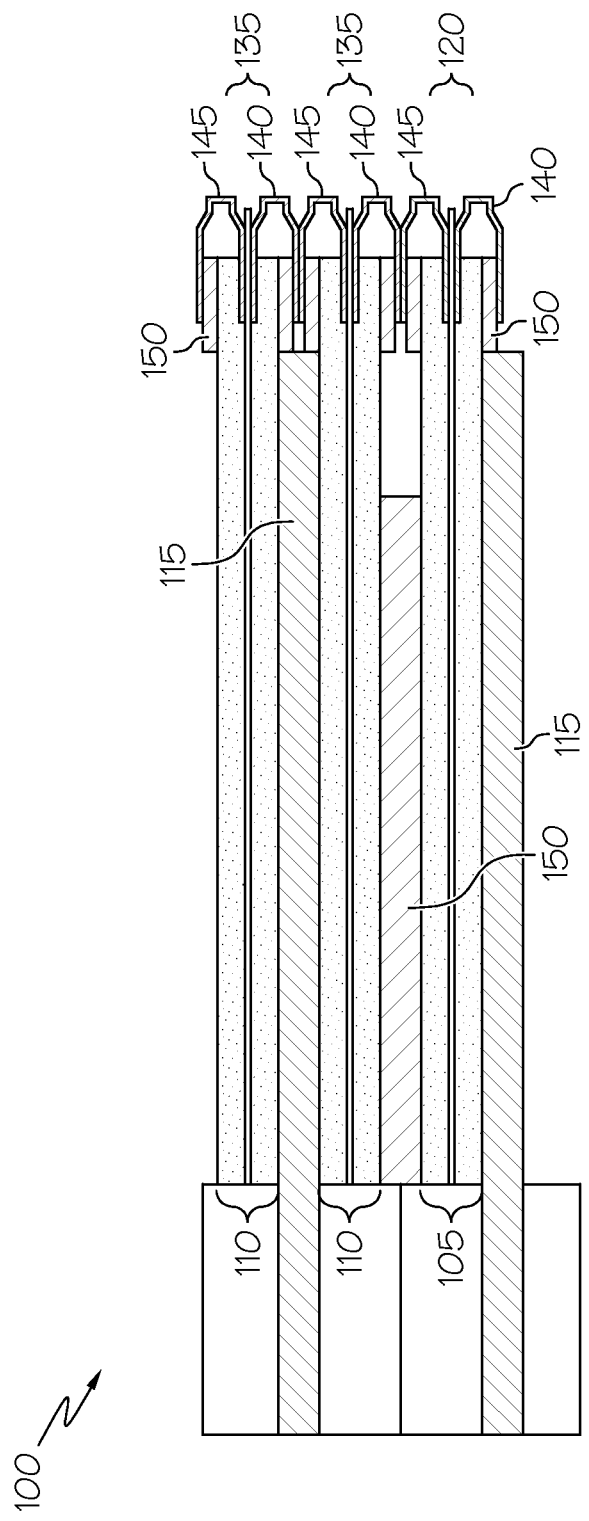
FIG. 2 is a cross-section of one embodiment of a battery pack.
Figure 3:
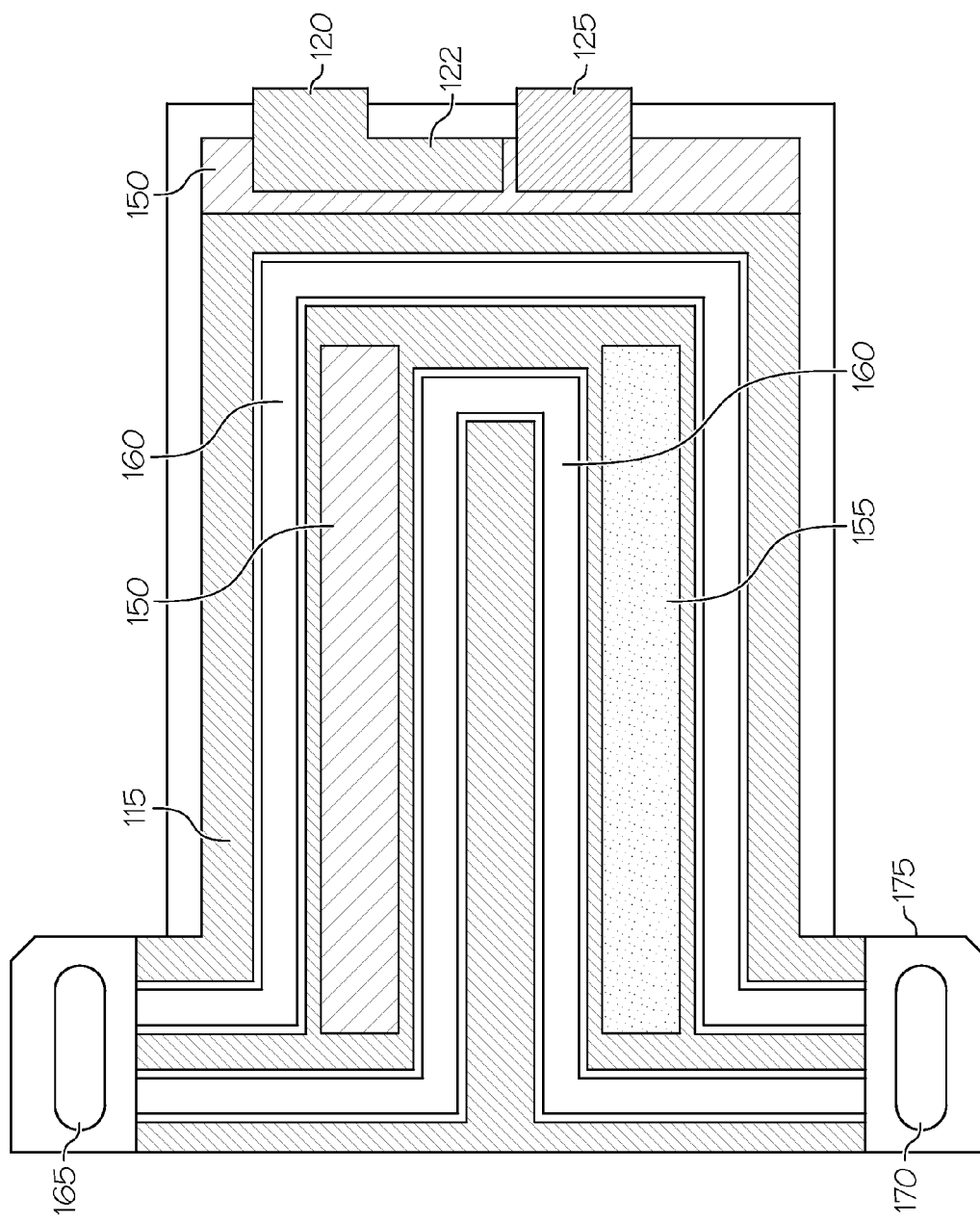
FIG. 3 is a view of a cooling fin and part of the battery cell of the battery pack of FIG. 2.

The fins 115 can be air or liquid cooled/heated. For air cooling/heating, the fin can be as simple as a flat metal sheet. It can optionally include slots 155 as discussed above, and/or a flange around the edge in a tray-like geometry (not shown) that can help position the cells more positively. For liquid cooling/heating, each fin 115 has coolant channels 160 in between two welded metal plates as well as coolant inlets 165 and coolant outlets 170. The coolant inlets 165 and outlets 170 can be individually connected to a manifold (not shown) for coolant circulation, or they can extend from the fins in ear-shaped features 175 and then be stacked together as shown in FIG. 2. To fill up the gap between the fins and to provide proper coolant sealing, the ear-like extensions can be molded with plastic 180 that is sealable or having rubber seals (not shown) around the openings for coolant. The coolant can thus be easily fed into and removed from end plates (not shown) of the stack.

Figure 12A:
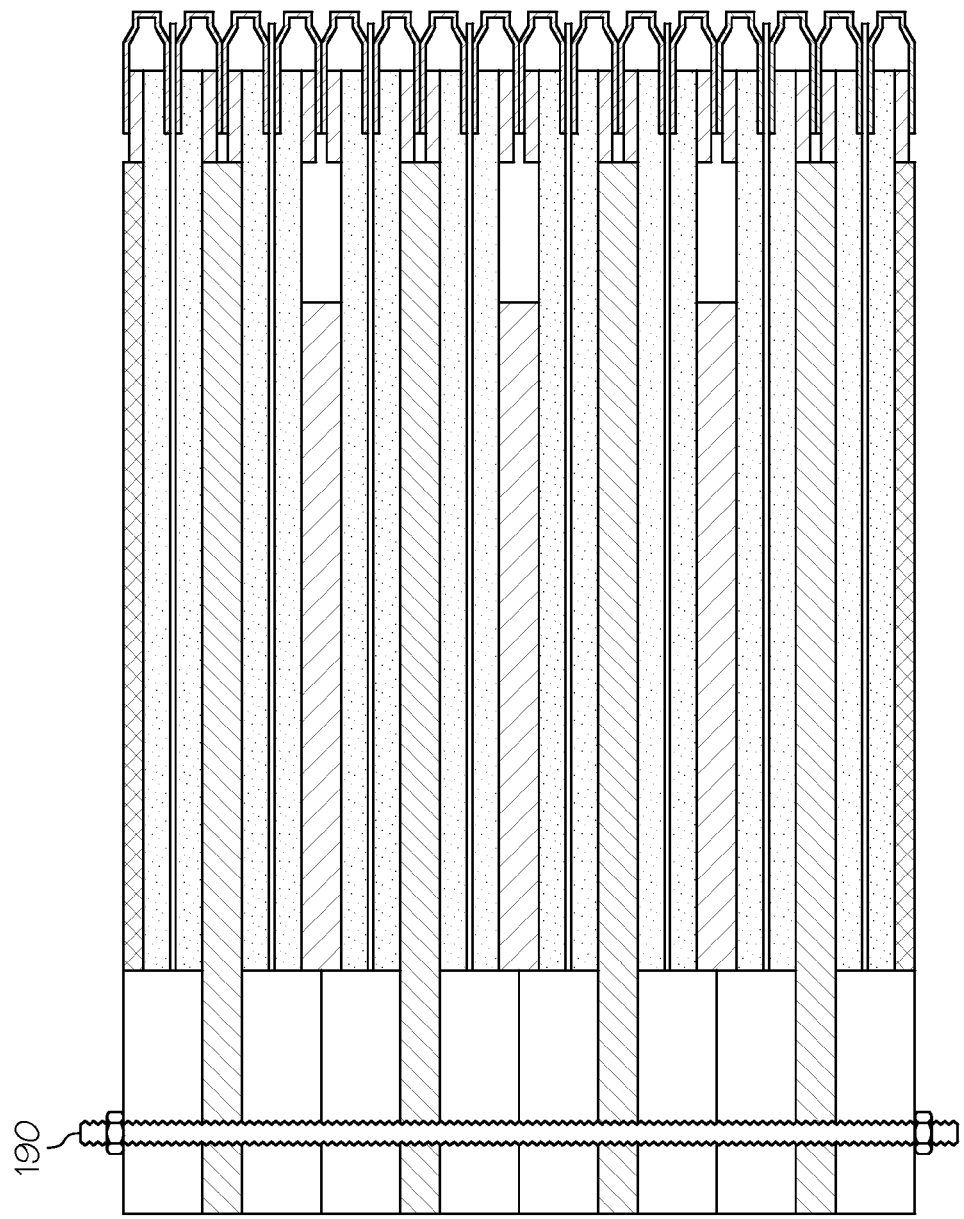
FIGS. 12A-C illustrate different embodiments of removable restraints.
Figure 12B:
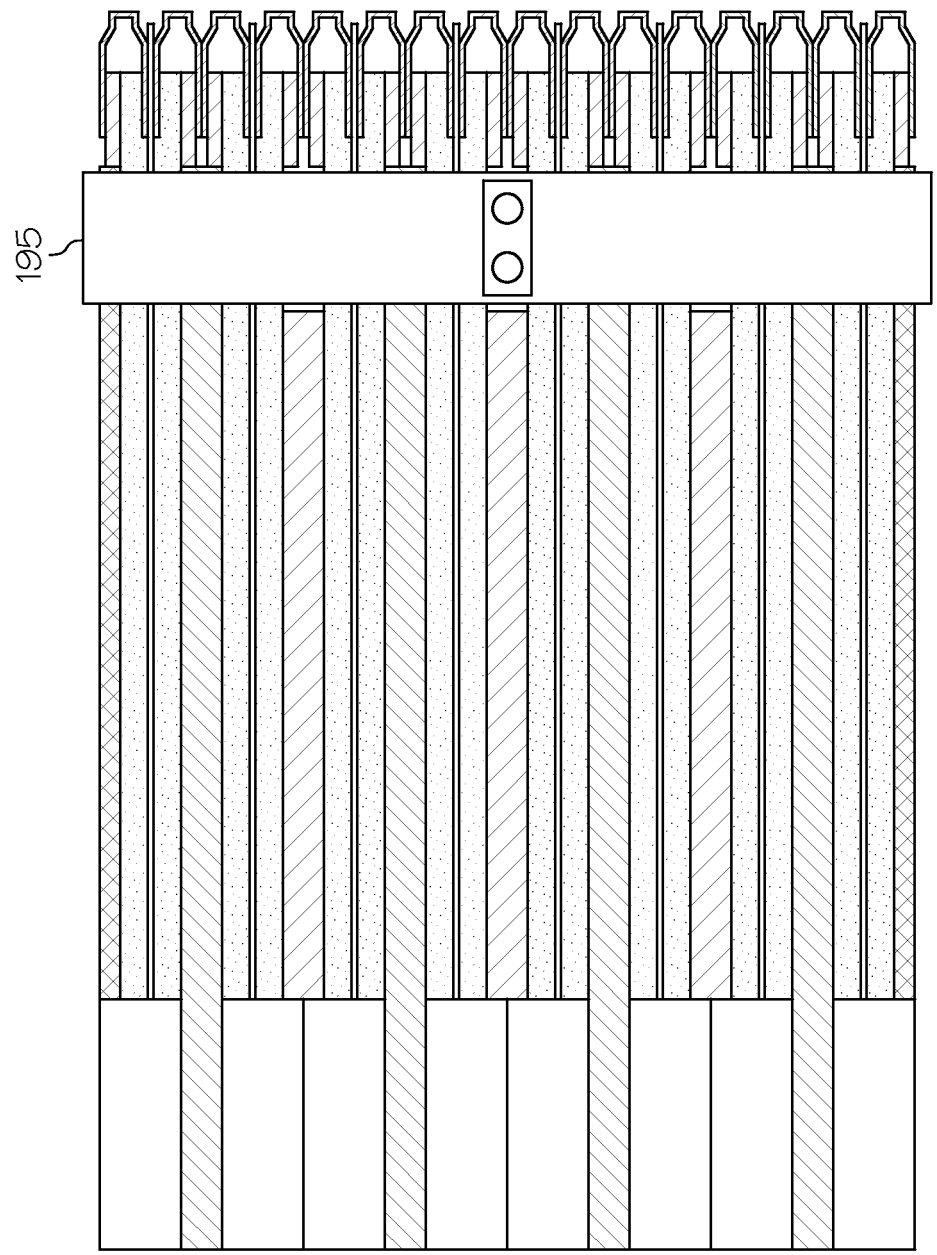
Figure 12C:
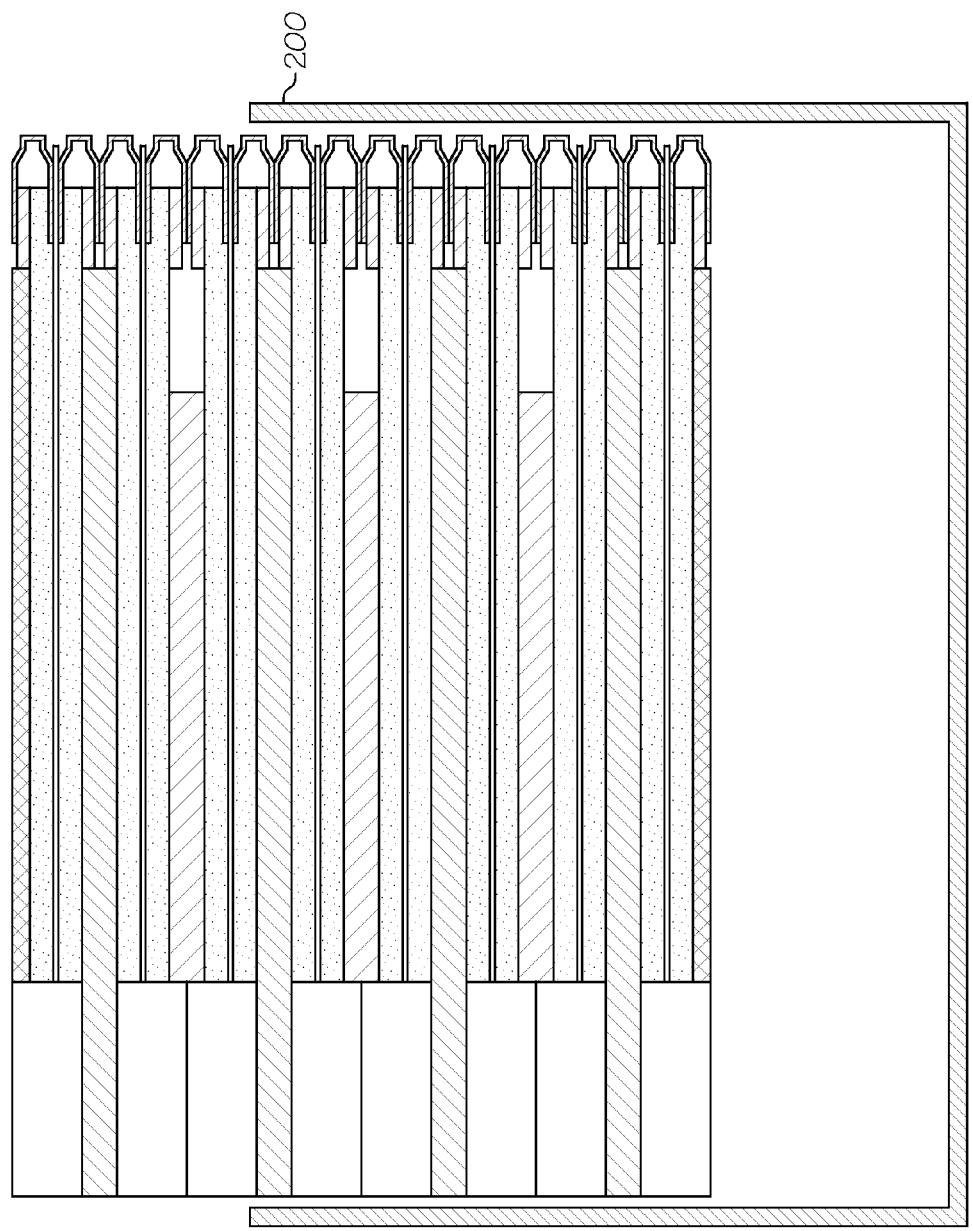

Because of higher stiffness, the fins 115 can be the primary structural and locating members of the stack to hold battery cells. After compression, the stack can be contained in removable restraints, including, but not limited to, clamping with bolts or tie rods 190 (FIG. 12A), wrapping with metal straps 195 (FIG. 12B), or boxing in a hard case 200 (FIG. 12C), for the final assembly, which saves the weight and cost of repeating frames, as well as assembly time. In remanufacturing, the stack can be easily disassembled because of the weld-free assembly, and any bad cells or other components can be replaced with minimal time and cost.

Figure 6:
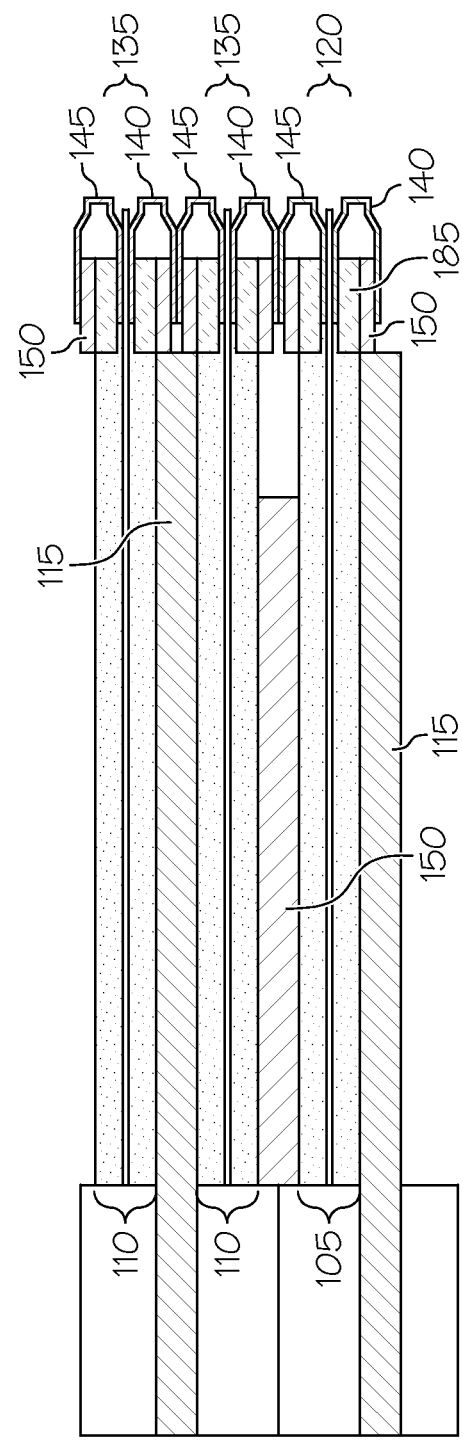
FIG. 6 is a cross-section of one embodiment of a battery pack.
Figure 7:
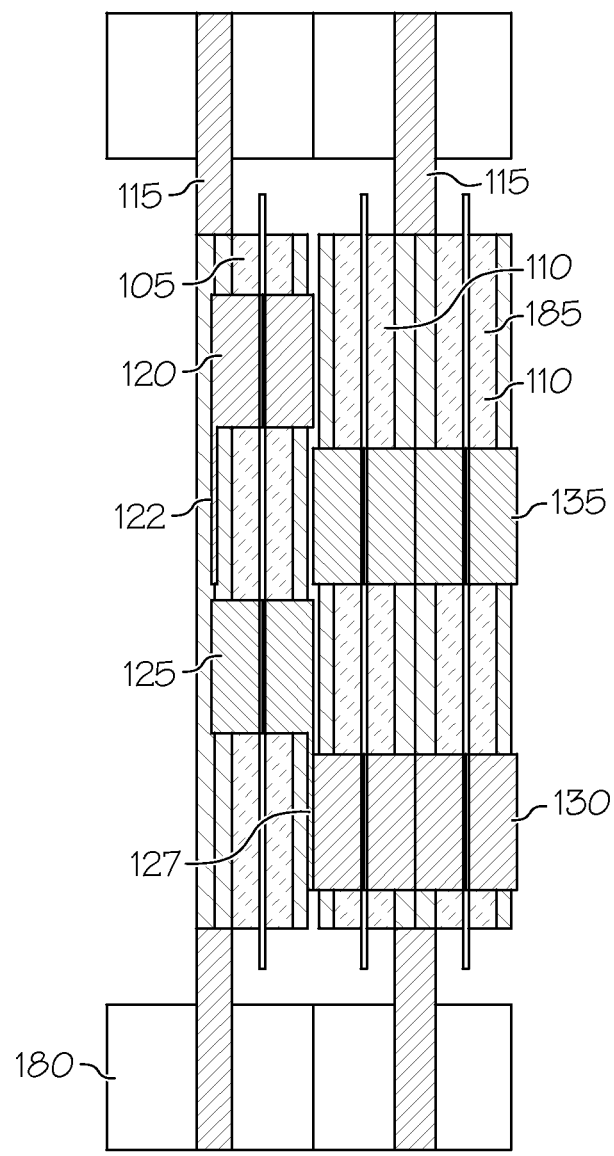
FIG. 7 is a top view of the battery pack of FIG. 6.

It is known that the electric resistance of a mechanical contact is inversely proportional to the contact force at the interface. Higher contact force will deform more microscopic surface asperities of the metal, and thus generate a larger contact area between the two surfaces, which in turn reduces the constriction resistance of electric current flow. Meanwhile, a higher contact force helps break down the oxidation films on metal surfaces and enhances the electric conductivity at the interface. However, when the electric terminals are positioned on the back of the cell as shown in FIGS. 2-5, this limits the contact or compression force when the stack is packaged at the end of assembly. Excessive compression could crush and damage the battery cells. FIGS. 6-7 show another embodiment in which a nonconductive compression bar 185 is embedded in the cell pouch to serve as a mechanical support of the electric terminals for higher contact force in the assembly. However, this approach requires making a change to the battery cell itself.

Figure 8:
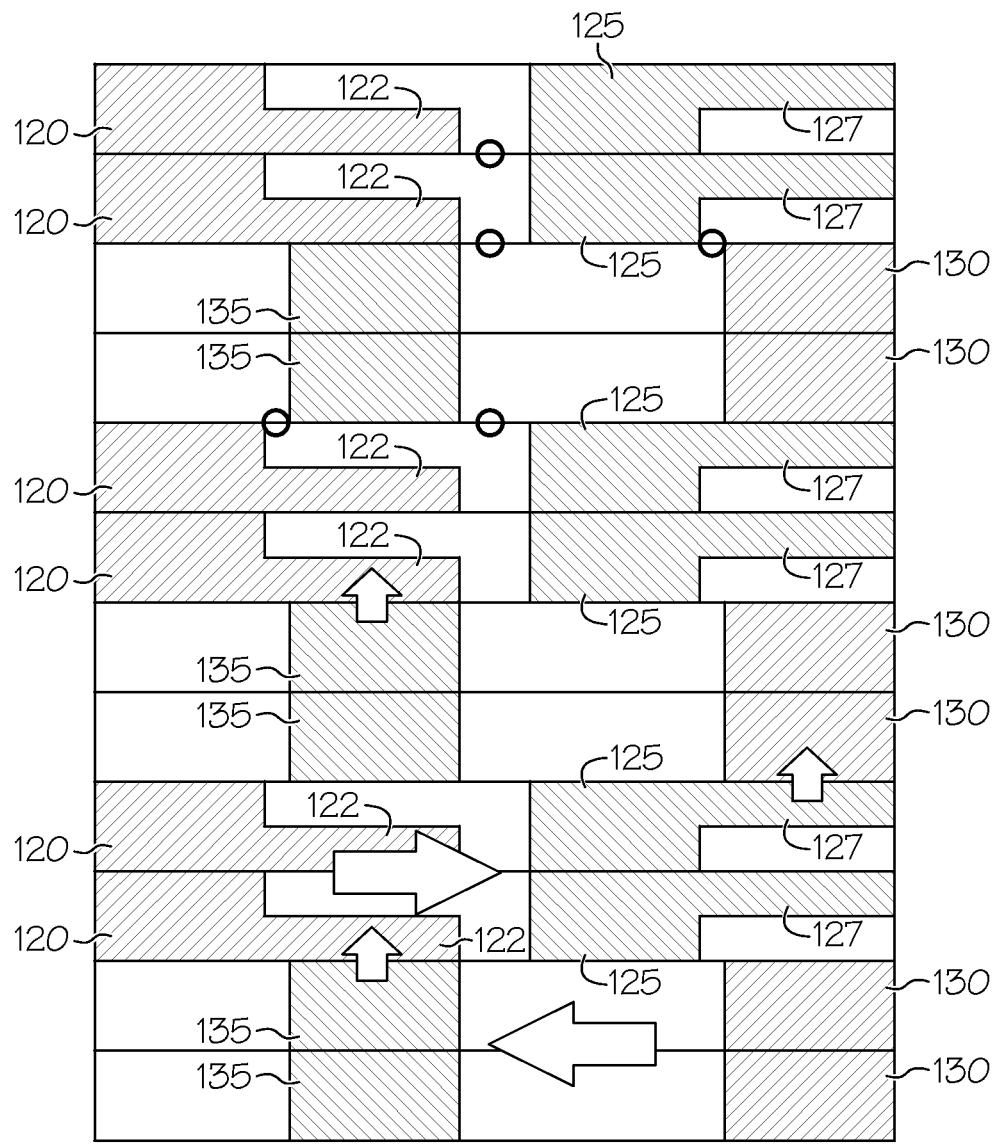
FIG. 8 is a schematic electric flow of the embodiment of FIG. 4.

FIG. 8 shows the schematic electric flow diagram of FIG. 4 with expanded number of cells stacked together. Due to the extended tabs and proximity of tab positions, there are several circled areas, five per repeating parallel—serial connection of cells in this particular example, that may have the risk of electrical short if there is any misalignment between cells during the stacking operation.

Figure 9:
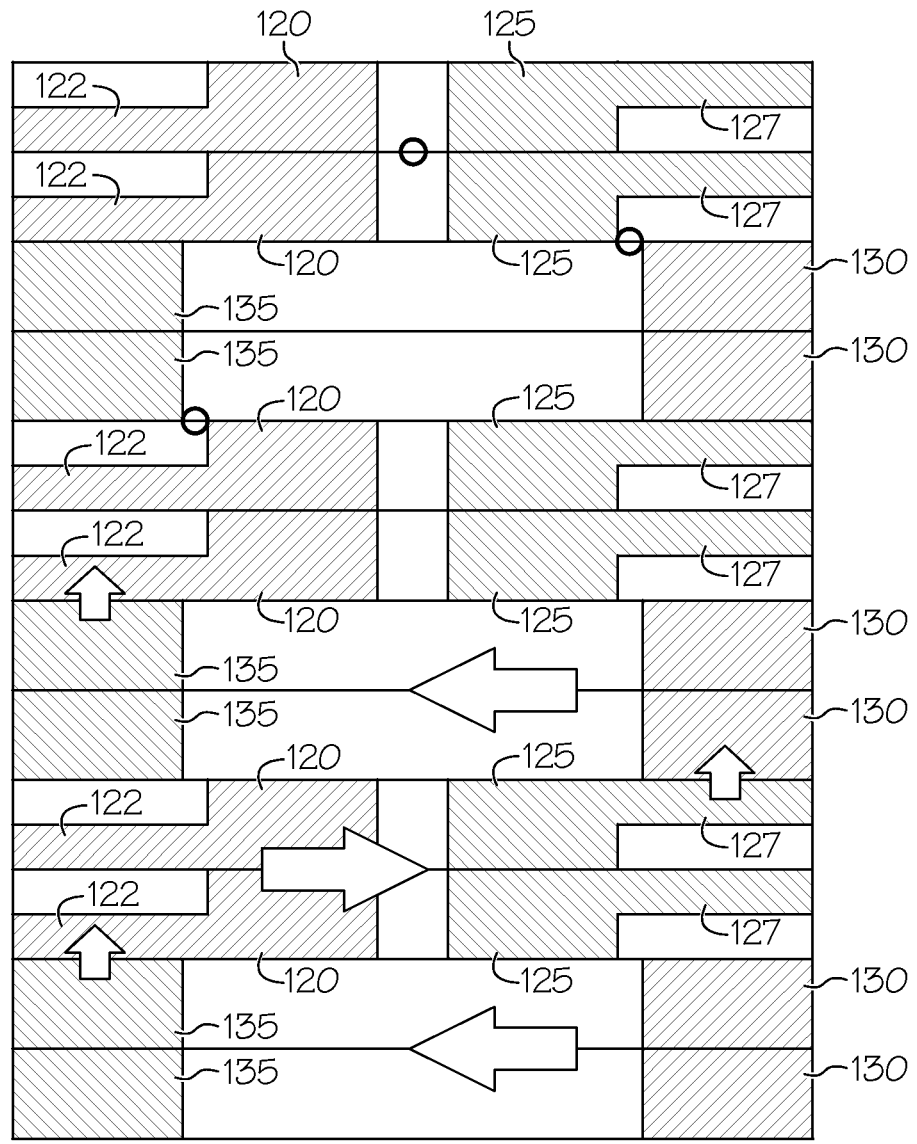
FIG. 9 is a schematic electric flow of an alternate embodiment.
Figure 11A:
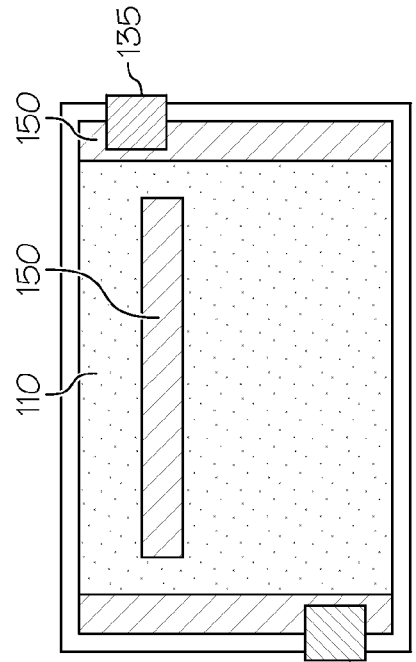
FIGS. 11A-D illustrate the battery cells of the embodiment of FIG. 10.
Figure 11C:
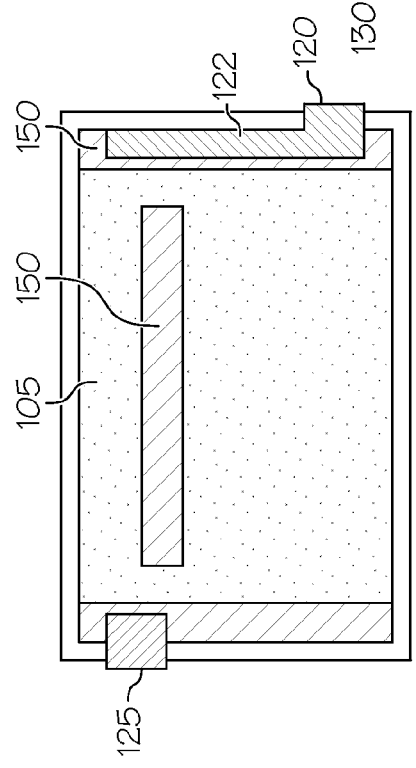
Figure 11B:
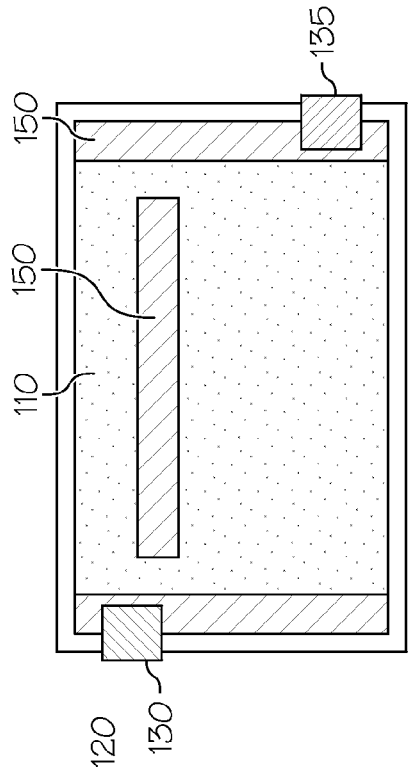
Figure 11D:
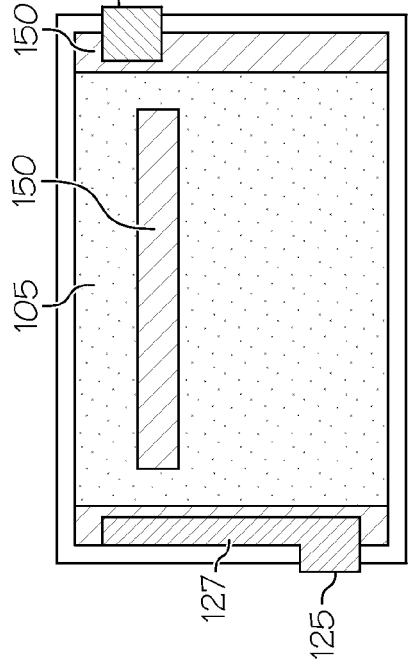

FIG. 9 shows an embodiment which mitigates the risk of electric short by rearranging the tab positions. For the cell 105, the extended portion 122 of the positive tab 120 and the extended portion 127 of the negative tab 125 point to the opposite directions, instead of the same direction as in FIG. 8, which result in tabs 120 and 125 closer to each other. On the other hand, for the cell 110, the positive tab 130 and negative tab 135 are separated further apart. With this tab arrangement, the risk of electric short is reduced from five to three places for the same pattern of parallel-serial cell connection. Nevertheless, the risk still exists.

FIG. 10 shows an embodiment that can eliminate the risk of electric short by separating the positive and negative tabs to the opposite edges of the cell. The diagram of FIG. 10 is essentially the same as that of FIG. 9, except the right half of the tabs is on the bottom edge of the cells, eliminating the chance of electric short due to stacking misalignment of cells. FIG. 11 illustrates the tab arrangement of FIG. 10.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A weld-free battery pack comprising:
 at least two solid battery cells in electrical contact, the battery cells having first and second faces, the battery cells having a positive tab and a negative tab on an edge of the battery cell, the positive tab comprising a pair of separable sub-tabs bent over the first and second faces of the cell, and the negative tab comprising a pair of separable sub-tabs bent over the first and second faces of the cell;

a positive terminal in electrical contact with one of the positive sub-tabs of one of the battery cells;

a negative terminal in electrical contact with one of the negative sub-tabs of another one of the battery cells;

at least one cooling fin positioned between the battery cells wherein the at least one cooling fin is at least one flat sheet of a stiffness to be a primary structural and locating member of a stack to hold the battery cells and wherein the at least one cooling fin has an edge flange that can be used to position the cells and;

a removable restraint around the battery cells and the fin;

at least one foam strip disposed between the at least two solid battery cells to form a solid contact between adjacent battery cells when the weld-free battery stack is compressed, the at least one foam strip configured to be attached to one of the faces of the battery cells;

wherein the at least two battery cells are connected by direct mechanical contact in a stack with no welding or interconnect frame; and wherein the at least one cooling fin has at least one slot positioned to accommodate the at least one foam strip, the at least one slot and the at least one foam strip cooperatively engaged such that the at least one foam strip extends into the at least one slot to align the at least two battery cells and the at least one cooling fin.

2. The battery pack of claim 1 wherein there are at least three battery cells and wherein there is at least one series connection and at least one parallel connection between the battery cells.

3. The battery pack of claim 1 wherein the positive tab and negative tab are on different edges of the battery cell.

4. The battery pack of claim 1 wherein the at least one foam strip is pre-attached to one of the faces of the battery cells.

5. The battery pack of claim 4 wherein the at least one foam strip comprises at least two foam strips and the at least one slot comprises at least two slots, the slots configured to be located on top and bottom of the at least one cooling fin, respectively, each slot configured to cooperatively engage at least one of the at least two foam strips.

6. The battery pack of claim 4 wherein at least one of the foam strips is positioned on an edge of the first or second face of one of the battery cells to support the positive or negative sub-tabs.

7. The battery pack of claim 1 wherein at least one of the battery cells has one positive sub-tab having an extended portion, and one negative sub-tab having an extended portion, the extended portions on opposite faces of the battery cell.

8. The battery pack of claim 7 wherein the extended portion of the positive sub-tab is in electrical contact with the negative sub-tab of one battery cell or the extended portion of the negative sub-tab is in electrical contact with the positive sub-tab of one battery cell forming a series connection.

9. The battery pack of claim 1 wherein the removable restraint comprises a metal band, a bolt, a tie rod, or a hard case.

10. The battery pack of claim 1 wherein the cooling fin includes a coolant inlet, a coolant outlet, and a coolant channel connecting the coolant inlet and the coolant outlet.

11. The battery pack of claim 1 wherein the battery cell further comprises a nonconductive compression bar on the edge having the positive or negative tab.

12. A weld-free battery pack comprising:

at least one first solid battery cell having first and second faces, the first battery cell having a positive tab and a negative tab on an edge of the battery cell, the positive tab comprising a pair of separable sub-tabs bent over the first and second faces of the cell, one sub-tab of the positive tab having an extended portion, and the negative tab comprising a pair of separable sub-tabs bent over the first and second faces of the cell, one sub-tab of the negative tab having an extended portion, the extended portion of the positive sub-tab and the extended portion of the negative sub-tab on opposite faces;

at least one second solid battery cell having first and second faces, the second battery cell having a positive tab and a negative tab on an edge of the battery cell, the positive tab comprising a pair of sub-tabs bent over the first and second faces of the cell, and the negative tab comprising a pair of sub-tabs bent over the first and second faces of the cell;

wherein the extended portion of the positive sub-tab of the first battery cell is in electrical contact with the negative sub-tab of the second battery cell or the extended portion of the negative sub-tab of the first battery cell is in electrical contact with the positive sub-tab of the second battery cell;

at least one cooling fin positioned between the battery cells wherein the at least one cooling fin is at least one flat sheet of a stiffness to be a primary structural and locating member of a stack to hold the battery cells and wherein the cooling fin has an edge flange that can be used to position the cells;

a positive terminal in electrical contact with one of the positive sub-tabs of one of the first or second battery cells;

a negative terminal in electrical contact with one of the negative sub-tabs of the another one of the first or second battery cells;

a removable band around the first and second battery cells and the fin wherein the at least two battery cells are connected by direct mechanical contact in a stack with no welding or interconnect frame;

at least one foam strip disposed between the at least one first battery cell and the at least one second battery to form a solid contact between adjacent battery cells when the weld-free battery stack is compressed, the at least one foam strip configured to be attached to one of the faces of the battery cells; and wherein the at least one cooling fin has at least one slot positioned to accommodate the at least one foam strip, the at least one slot and the at least one foam strip cooperatively engaged such that the at least one foam strip extends into the at least one slot to align the at least two battery cells and the at least one cooling fin.

13. The battery pack of claim 12 wherein there are at least three battery cells and wherein there is at least one series connection and at least one parallel connection between the battery cells.

14. The battery pack of claim 12 wherein the positive tab and negative tab are on different edges of the battery cell.

15. The battery pack of claim 12 wherein at least one foam strip is pre-attached to one of the faces.

16. The battery pack of claim 15 wherein the at least one foam strip comprises at least two foam strips and the at least one slot comprises at least two slots, the slots configured to be located on top and bottom of the at least one cooling fin, respectively, each slot configured to cooperatively engage at least one of the at least two foam strips.

17. The battery pack of claim 15 wherein at least one of the foam strips is positioned on an edge of the first or second face of one of the battery cells to support the positive or negative sub-tabs.

18. The battery pack of claim 12 wherein the removable restraint comprises a metal band, a bolt, a tie rod, or a hard case.

19. The battery pack of claim 12 wherein the cooling fin includes a coolant inlet, a coolant outlet, and a coolant channel connecting the coolant inlet and the coolant outlet.

20. The battery pack of claim 12 wherein the battery cell further comprises a nonconductive compression bar on the edge having the positive or negative tab.

* * * * *